United States Patent [19]

Kitano et al.

[11] Patent Number: 5,645,157

[45] Date of Patent: Jul. 8, 1997

[54] FLEXIBLE CONVEYOR BELT

[75] Inventors: Kimikazu Kitano, Osaka; Takao Kanda, Aichi; Takao Henmi, Kanagawa; Futoshi Makino, Kanagawa; Junji Sato, Kanagawa, all of Japan

[73] Assignee: Mitsuboshi Belting Ltd., Hyogo, Japan

[21] Appl. No.: 377,014

[22] Filed: Jan. 23, 1995

[30] Foreign Application Priority Data

Jan. 24, 1994 [JP] Japan .................................. 6-023114

[51] Int. Cl.$^6$ ........................... B65G 15/08; B65G 15/34; B65G 15/60
[52] U.S. Cl. .................... 198/811; 198/818; 198/847
[58] Field of Search .................... 198/811, 818, 198/823, 847

[56] References Cited

U.S. PATENT DOCUMENTS 794,381  7/1905  Robins ........................ 198/818 X
3,900,627  8/1975  Angioletti et al. ............... 198/847 X
4,185,736  1/1980  Jonkers ........................... 198/811

FOREIGN PATENT DOCUMENTS 4317911  9/1992  Japan ........................... B65G 15/08

*Primary Examiner*—F. J. Bartuska
*Attorney, Agent, or Firm*—Sughrue, Mion, Zinn, Macpeak & Seas

[57] ABSTRACT

A flexible conveyor belt is provided which can run in a curved shape which elongates along a lower inner wall of a circular pipe, while being completely supported above the lower inner wall by pressurized air introduced into a space between the belt and the lower inner wall. In the case where the flexible conveyor belt is mainly made of rubber, a trough index T (JIS K6322) which is obtained as a ratio of a deflection amount F to a width x of the belt is equal to or greater than 0.35. More strictly, it is preferable to set the thickness y (mm) and the width x (mm) of the belt to satisfy the relationship of $y \leq 0.143 + 6.486 \times 10^{-3} x + 7.904 \times 10^{-6} x^2$. In the case where the flexible conveyor belt is made mainly of a resin, the trough index is equal to or greater than 0.30. The conveyor belts have sufficient flexibility.

10 Claims, 5 Drawing Sheets

FLEXIBLE CONVEYOR BELT

BACKGROUND OF THE INVENTION

The present invention relates to a flexible conveyor belt which has a curved shape that elongates along a lower inner wall of a circular pipe, which runs while being supported above the lower inner wall by air introduced into a space between the belt and the lower inner wall, and which is mainly made of rubber or a resin.

A conveyor apparatus using such a flexible conveyor belt is called a pipe conveyor, and is employed for transporting general bulk goods such as sand, crushed stone, coal, or cement, or foods or grain such as wheat, soybean, or rice. An example of such a pipe conveyor will be described with reference to FIG. 7. Reference is made to Japanese Patent Publication (Kokai) No. Hei 4-317,911 for a pipe conveyor. In the pipe conveyor, an inner circular pipe 10 and an outer circular pipe 20 are disposed so as to constitute a coaxial double pipe, and a head pulley 30 and a tail pulley 40 are placed at the opposite ends of the inner and outer pipes 10 and 20, respectively.

A flexible conveyor belt 1 is extended between the pulleys 30 and 40. The forward belt 51 of the flexible conveyor belt 1 runs in a curved shape which elongates along the lower inner wall of the inner circular pipe 10, and the return belt 52 runs in a curved shape which elongates along the lower inner wall of the outer circular pipe 20. Seal members 60 are respectively attached to gap portions at both ends of the inner and outer pipes 10 and 20 and between the two pipes, excluding the portion through which the return belt 52 passes.

As shown in FIG. 8, an air duct 23 is attached to the lower portion of the outer circular pipe 20, and air blowing holes 22 through which air is guided from the air duct 23 to the lower inner wall of the outer circular pipe 20 are opened at regular intervals. A flange 89 is formed on a side face of the outer circular pipe 20. Air introduced into the space between the outer circular pipe 20 and the inner circular pipe 10 is guided to the lower inner wall of the inner circular pipe 10 through air blowing holes 12 which are opened at regular intervals in the inner circular pipe 10.

Returning to FIG. 7, an air blowing apparatus 80 is connected between the air duct 23 and the flange 89. In the apparatus 80, air pipes 83 and 84 are connected in parallel to the outlet of an air blower 82 having an air filter 81 disposed at the inlet, and the one air pipe 83 is connected to a flange 86 of the air duct 23 through a damper 85. Similarly, the other air pipe 84 is connected to the flange 89 through a damper 88.

In the above conveyor apparatus, goods to be conveyed M which are charged through a loading port 21 are transported on the forward belt 51 as shown in FIG. 8, and then drop from the head pulley 30 as shown in FIG. 7. The flexible conveyor belt runs while being supported by air above the lower inner walls of the respective circular pipes. Consequently, the conveyor apparatus has an advantage in that the power consumption for transportation and the noise level are much lower than those in a pneumatic conveyor, a roller conveyor, or a chain conveyor.

In the conveyor apparatus, the electric power required for transportation depends on the degree that the conveyor belt is raised by the air as the conveyor belt runs along the lower inner walls of the circular pipes. Therefore, it has been desired to develop a conveyor belt which can be surely supported by an air bearing along a circular pipe.

SUMMARY OF THE INVENTION

In order to support the conveyor belt by an air bearing to a level as high as possible, countermeasures such as raising the air pressure are generally taken. Even when the air pressure is raised to a higher degree, the coefficient of friction still remains high, thereby often producing a problem wherein the power consumption for transportation is unduly high.

The inventor has conducted intensive experiments to study the reason why the power consumption cannot be reduced, and discovered that the phenomenon shown in FIG. 9 occurs. Particularly, the inner circular pipe 10 is a component along which the forward belt 51 bearing the goods M runs, and the width x of the forward belt 51 extends over approximately one-half of the internal circumference of the inner circular pipe 10. Although most portions of the forward belt 51 are supported by air introduced through the lower inner wall, the edge portions 51a and 51b of the forward belt 51 remain in contact with the inner wall. Hence, air does not escape along the circumferential directions, but rather along the axial directions of the inner circular pipe 10. Thus, it has been found that the contacting of the edge portions 51a and 51b of the forward belt 51 with the inner wall of pipe 10 causes the power consumption for transportation to be increased.

The present invention has been made in view of the above-described problem. It is an object of the present invention to provide a flexible conveyor belt which can run in a curved shape which elongates along the lower inner wall of a circular pipe, while being completely supported above the lower inner wall by air introduced into a space between the belt and the lower inner wall.

In a flexible conveyor belt which can attain the object, when the belt is made mainly of rubber, a trough index T (JIS K6322) which is obtained as a ratio of a deflection amount F to the width x of the belt is equal to or greater than 0.35. More strictly, it is preferable to set the thickness y (mm) and the width x (mm) of the belt to satisfy the relationship of $y \leq 0.143 + 6.486 \times 10^{-3} x + 7.904 \times 10^{-6} x^2$. When the flexible conveyor belt is made mainly of a resin, the trough index is equal to or greater than 0.30.

In the flexible conveyor belt which is made mainly of rubber, the portions, excluding canvas or the like, which function as a tensile strength member are made of rubber. Rubber materials useful in such a belt include Natural Rubber (NR), Styrene Butadiene Rubber (SBR), Acrylonitrile-Butadiene Rubber (NBR), Ethylene-Propylene Elastomers (EPR), Chloroprene Rubber (CR), and Butyl Rubber (BR).

In the flexible conveyor belt which is made mainly of a resin, the portions, excluding canvas or the like, which function as a tensile strength member are made of a resin. Resin materials useful in such a belt include polyurethane, polyvinyl chloride, polyvinylon, fluororesin, polyester, and polyethylene.

When a belt has a trough index T which is equal to or greater than 0.35 or 0.30 according to JIS K6322, the belt is very flexible, and, therefore, easily takes on a curved shape which elongates along the inner wall of a circular pipe. Consequently, only a weak force acts on the both edges of the flexible conveyor belt so that air introduced into the lower portion of the circular pipe easily escapes past both side edges of the conveyor belt along the circumferential directions. This allows the flexible conveyor belt to be completely supported by the pressurized air. In flexible conveyor belts which are made mainly of rubber, in particular, the effects are not constant depending on the relationship between the belt width and the belt thickness, even when the trough indexes are equal to each other. More strictly, therefore, it is preferable to set the thickness y (mm) and the width x (mm) of the belt to satisfy the relationship of $y \leq 0.143 + 6.486 \times 10^{-3} x + 7.904 \times 10^{-6} x^2$.

BRIEF DESCRIPTION OF THE DRAWINGS

The above objects and advantages of the present invention will become more apparent by describing in detail a preferred embodiment thereof with reference to the accompanying drawings, in which.

DETAILED DESCRIPTION OF THE PREFERRED EMBODIMENTS

Figure 1:
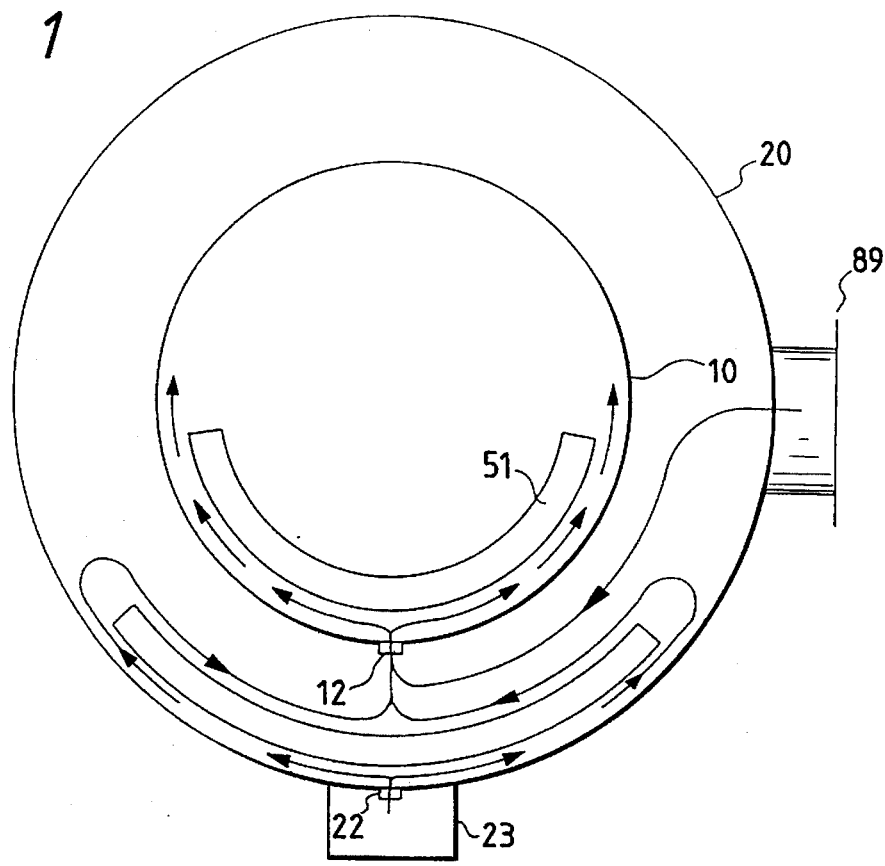
FIG. 1 is a diagram showing a state of using the flexible conveyor belt according to the present invention.

Hereinafter, embodiments of the invention will be described with reference to the drawings. FIG. 1 is a diagram showing a state of using the flexible conveyor belt of the invention.

Figure 7:
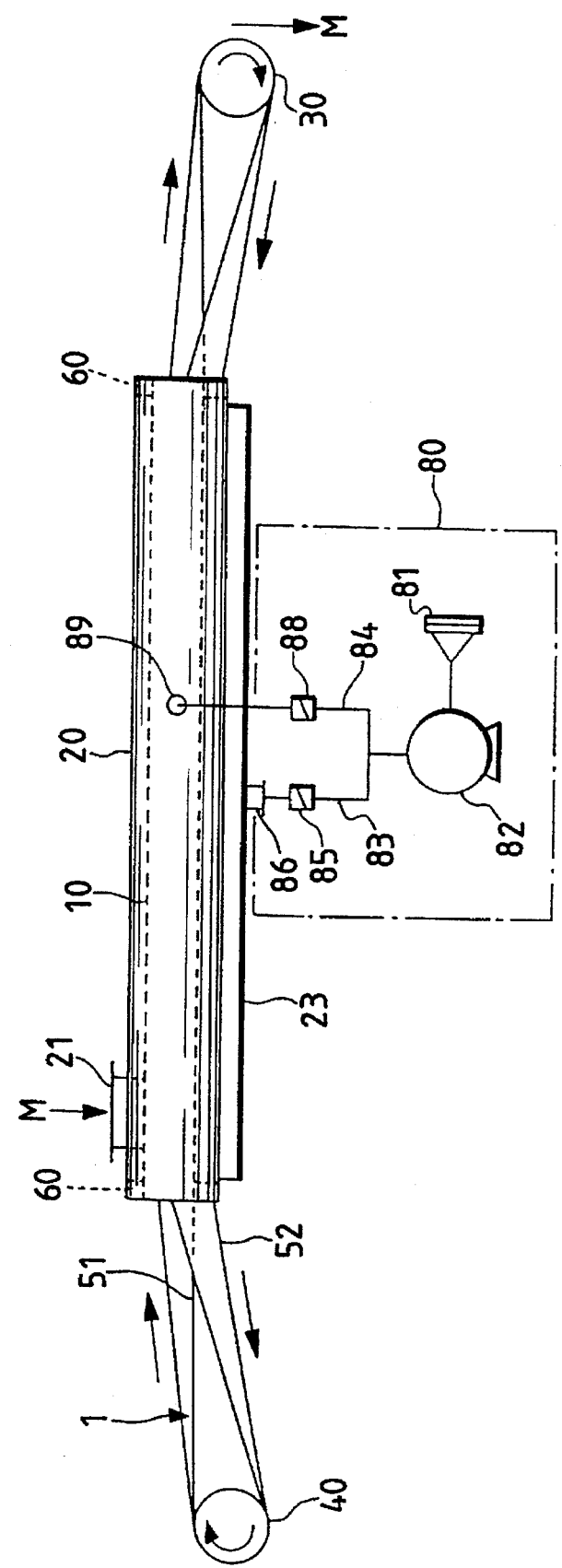
FIG. 7 is an explanatory diagram showing an entire conveyor apparatus using a flexible conveyor belt.
Figure 8:
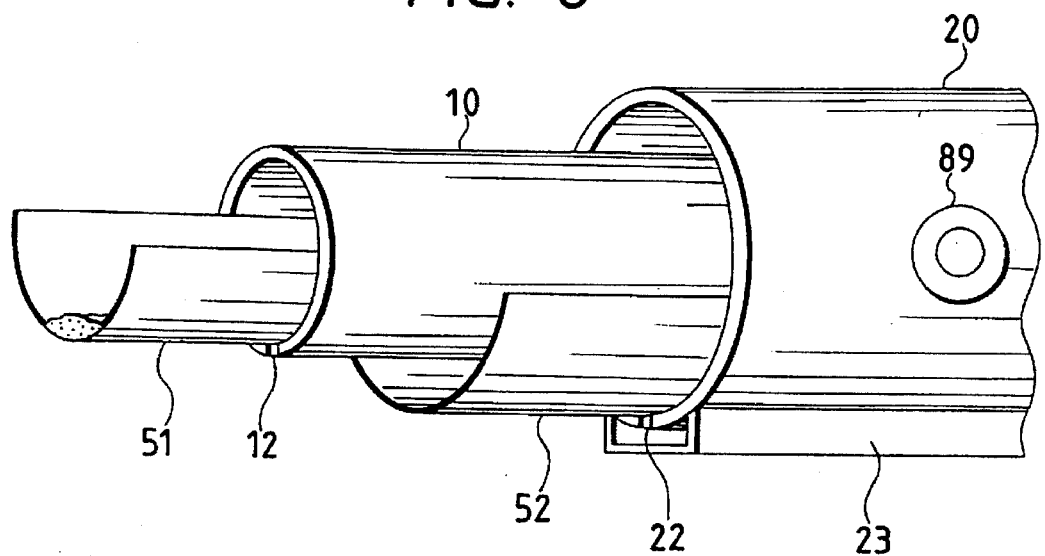
FIG. 8 is an explanatory diagram showing the structure of the main portion of the conveyor apparatus.
Figure 9:
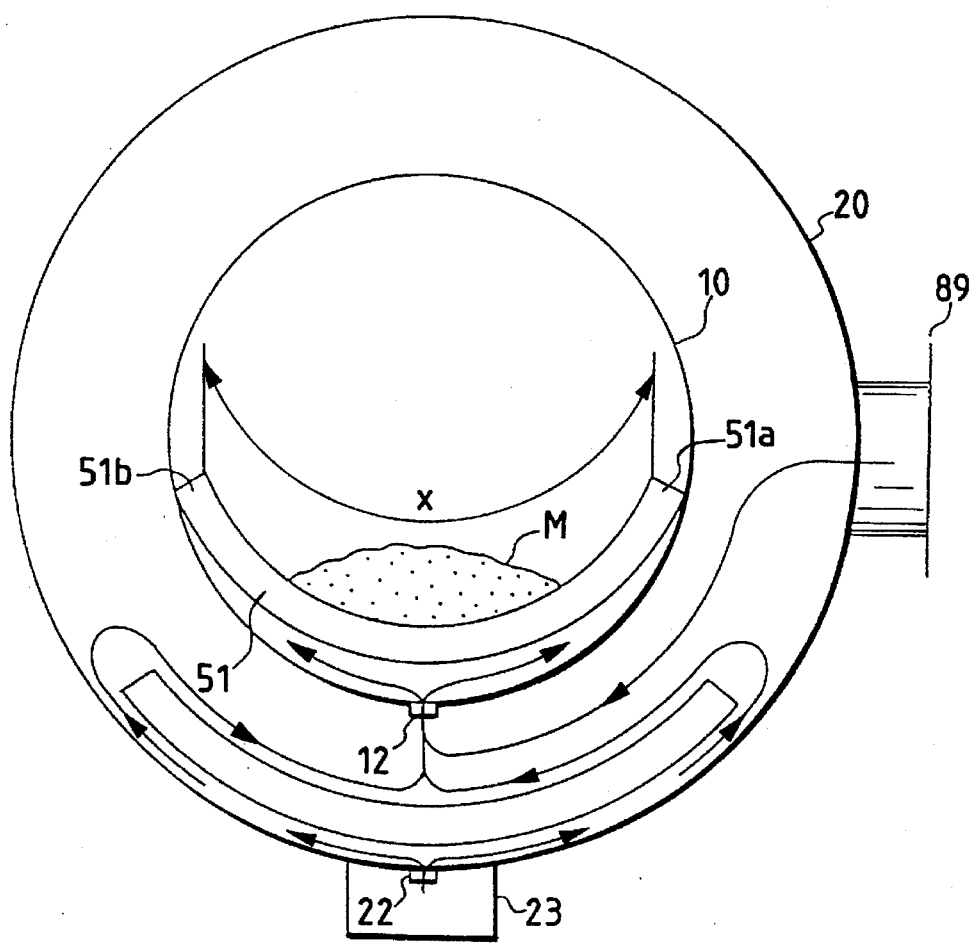
FIG. 9 is an explanatory diagram showing a state of using a flexible conveyor belt which produces a power consumption problem.

In FIG. 1, air which is introduced through the air blowing holes 12 formed in the lower portion of the inner wall of the inner circular pipe 10 escapes along the circumferential directions as indicated by arrows, and the entire forward belt 51 is supported by pressurized air so that both edges of the forward belt 51 are completely supported by air without contacting the inner wall of the inner circular pipe 10. The forward belt 51 has a width which is slightly shorter than one-half of the circumference (diameter×PI) of the inner circular pipe 10. In order to transport a large amount of goods, the width of the forward belt 51 is preferably set to have a value as large as possible. When the width exceeds one-half of the circumference, however, a sagging phenomenon may occur, or the forward belt 51 may become difficult to wind unless the distance between the pipe outlet and the pulley shown in FIG. 7 is set to be long. Therefore, the condition which is most severe from the view point of the flexibility is produced when the width is substantially one-half of the internal circumference of the inner circular pipe 10. Also, under this condition, both edges of the forward belt 51 do not make contact with the inner wall.

When the belt is completely supported by air as described above, the coefficient of friction between the belt and the inner wall of the circular pipe is as small as 0.02 to 0.1. By contrast, when the belt is not completely supported by air, in the case where the contact face of the belt is composed of canvas, the coefficient of friction is 0.2 to 0.5, and, in the case where the contact face of the belt is composed of rubber, the coefficient of friction is 0.5 to 1.0. Consequently, the coefficient of friction of 0.02 to 0.1 which is obtained as a result of the complete support by air is a value sufficient for reducing the power consumption of the conveyor apparatus.

In order to obtain a flexible conveyor belt which attains the complete support by air, the flexibility is set to be much greater than that of a conventional conveyor belt. The degree of flexibility is quantified by means of a trough index which is defined in JIS K6322.

Figure 2:
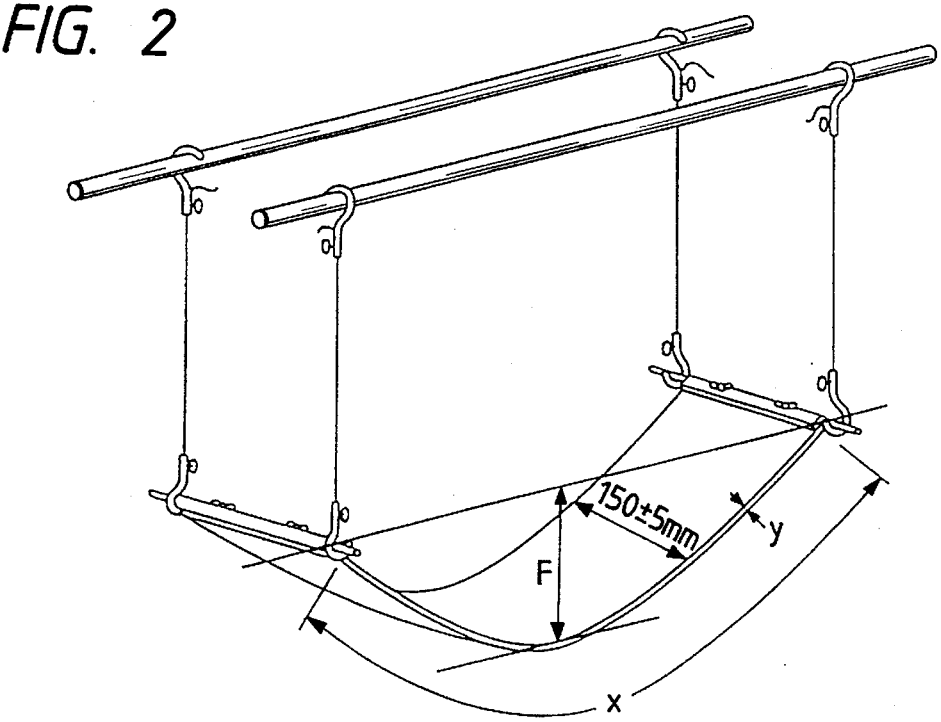
FIG. 2 is a perspective view showing a state of measuring a trough index.

FIG. 2 is a perspective view showing a state of measuring a trough index in accordance with JIS K6322. The width x (mm) and the thickness y (mm) of a sample belt are suitably determined in accordance with the service conditions, but the length is set to be 150±5 mm. When both edges of the sample belt are supported so that the belt is vertically hung through wires, the belt is arcuately deflected as illustrated. The deflection amount F is measured, and then F/x is calculated to obtain the trough index T.

Next, experiments in which the diameter of the inner pipe or the belt width, and also the specification of belts were variously changed in the case of a flexible conveyor belt mainly made of rubber (a mixture of NR and SBR) will be described with reference to Table 1 below. The experiments were conducted by setting the trough index T so as to have various values in order to attain the complete support by air. When the coefficient of friction was 0.08 or less, the belt was judged as excellent (⊚), when the coefficient of friction was greater than 0.08 but less than or equal to 0.1, the belt was judged as good (o), and, when the coefficient of friction was greater than 0.1, the belt was judged as poor (×). The belts are made of rubber. In the indication EP-100 shown in the belt specification column, E indicates that the warp is polyester yarn, P indicates that the weft is nylon yarn, and 100 indicates that the tenacity per ply is 100 kg/cm·width. The indication ST-200 shown in the belt specification column indicates that the belt is made of rubber, steel cord is used, and the tenacity is 200 kg/cm·width.

TABLE 1

| No. | Diameter of inner pipe (φmm) | Belt Width (mm) | Belt specification: (tensile strength member) × ply number × (front cover thickness) × (back cover thickness) Kg/cm · width × (ply) × (mm) × (mm) | Total Thickness (mm) | Through Index | Coefficient of friction | Judgement | Remarks |
| --- | --- | --- | --- | --- | --- | --- | --- | --- |
| 1 | 207.3 | 310 | EP-100 × 1 × 0.3 × 0.3 | 1.3 | 0.41 | 0.08 | ⊚ | Invention |
| 2 | 207.3 | 310 | EP-100 × 1 × 1.0 × 1.0 | 2.7 | 0.37 | 0.1 | O | Invention |

TABLE 1-continued

| No. | Diameter of inner pipe (φmm) | Belt Width (mm) | Belt specification: (tensile strength member) × ply number × (front cover thickness) × (back cover thickness) Kg/cm · width × (ply) × (mm) × (mm) | Total Thickness (mm) | Through Index | Coefficient of friction | Judgement | Remarks |
| --- | --- | --- | --- | --- | --- | --- | --- | --- |
| 3  | 207.3 | 310 | EP-100 × 1 × 1.3 × 1.3 | 3.7 | 0.29  | 0.15 | X | Comparison |
| 4  | 207.3 | 310 | EP-100 × 2 × 1.0 × 1.0 | 4.0 | 0.30  | 0.3  | X | Comparison |
| 6  | 343   | 500 | EP-100 × 1 × 1.3 × 1.3 | 3.7 | 0.384 | 0.03 | ⊚ | Invention |
| 7  | 343   | 500 | EP-100 × 2 × 1.0 × 1.0 | 4.0 | 0.380 | 0.02 | ⊚ | Invention |
| 8  | 343   | 500 | EP-100 × 1 × 1.5 × 1.5 | 4.2 | 0.366 | 0.07 | ⊚ | Invention |
| 9  | 343   | 500 | EP-100 × 1 × 2.0 × 2.0 | 5.2 | 0.35  | 0.1  | O | Invention |
| 10 | 343   | 500 | EP-100 × 2 × 3.0 × 3.0 | 8.0 | 0.31  | 0.2  | X | Comparison |
| 11 | 582   | 800 | EP-100 × 2 × 3.0 × 3.0 | 8.0 | 0.39  | 0.03 | ⊚ | Invention |
| 12 | 582   | 800 | EP-100 × 3 × 2.0 × 2.0 | 6.7 | 0.41  | 0.02 | ⊚ | Invention |
| 13 | 582   | 800 | ST-200 × 3.0 × 3.0     | 8.0 | 0.37  | 0.06 | ⊚ | Invention |

Belt Nos. 1 to 4 in Table 1 have a small width or a width of 310 mm. In these belts, as the trough index is smaller, the coefficient of friction is greater irrespective of the belt specification. Belt No. 2 which has a trough index of 0.37 was barely judged as good (o), and the belts which have a smaller trough index were judged as poor (x).

Belt Nos. 6 to 10 in Table 1 have a medium width or a width of 500 mm. In these belts, as the trough index is smaller, the coefficient of friction is greater irrespective of the ply number. Belt No. 9 which has a trough index of 0.35 was barely judged as good (o).

Belt Nos. 11 to 13 in Table 1 have a large width or a width of 800 mm. In these belts, as the trough index is smaller, the coefficient of friction is greater irrespective of the belt specification. Belt No. 13 which has a trough index of 0.37 was judged as excellent (⊚) with a sufficient margin.

Figure 3:
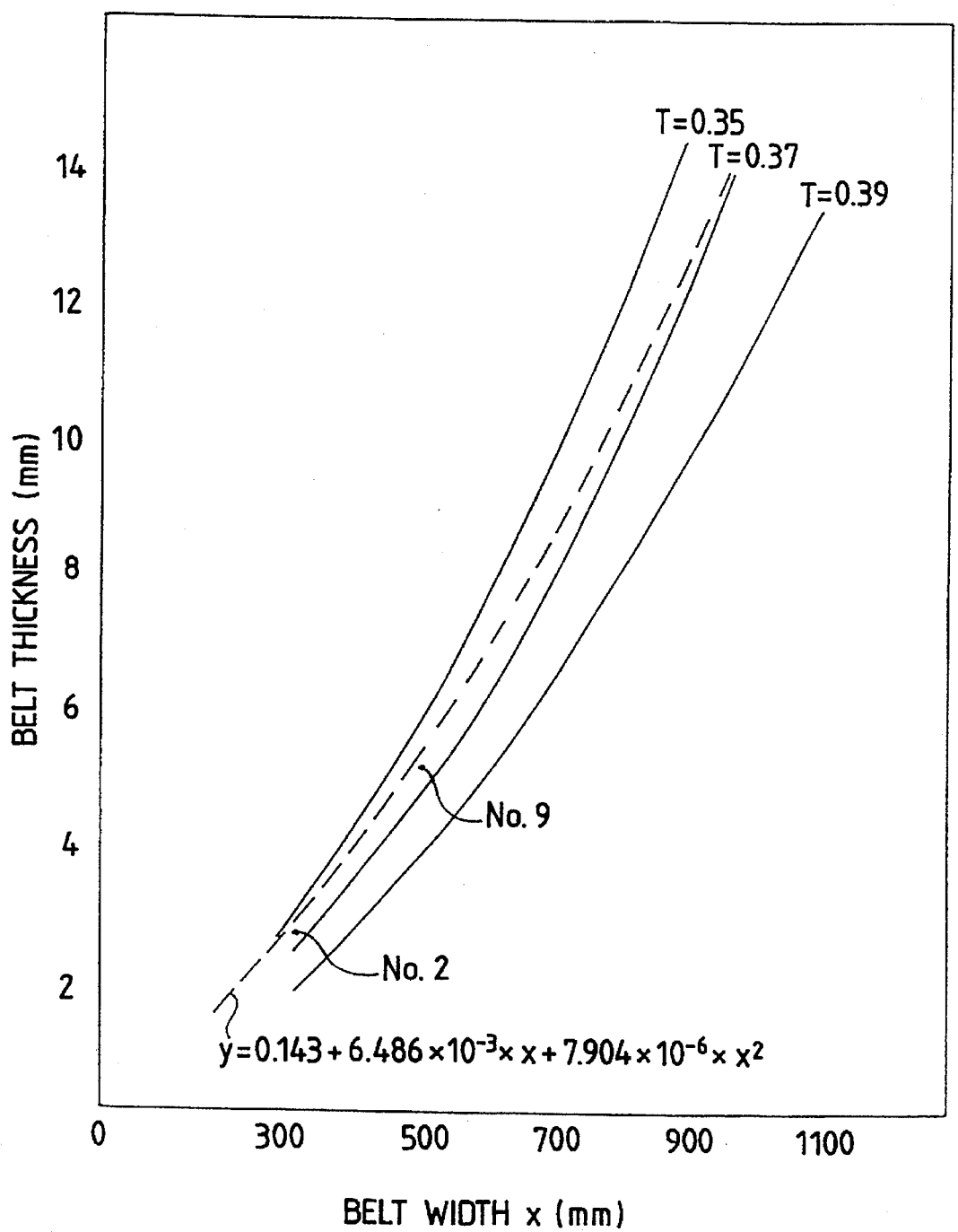
FIG. 3 is a graph showing an adequate range of a conveyor belt made of rubber.

As a result of these experiments, in the case of a flexible conveyor belt which is made mainly of rubber, it will be noted that, when the trough index is 0.35 or greater, the belt has a coefficient of friction of 0.1 or less and can be judged as satisfactory. When the belts having a width of 310 mm, 500 mm, or 800 mm are compared with each other, however, it will be noted that, even when they have the same trough index, the coefficient of friction tends to be greater as the belt width is smaller. This means that a trough index is insufficient for determining the strictly satisfactory range. FIG. 3 is a graph of the belt width x (mm) and the thickness y (mm) in which curves of constant trough indexes are drawn in order to obtain a further satisfactory range. More strictly, a trough index of 0.37 or greater is satisfactory. When the belt width x is small, however, there is a case where the trough index is not required to be as great as such a value, as indicated by belt Nos. 2 and 9, and it will be noted that a belt in which the thickness y and the width x satisfy the relationship of $y \leq 0.143 + 6.486 \times 10^{-3}x + 7.904 \times 10^{-6}x^2$ is acceptable. Consequently, the strictly satisfactory range is a range where the thickness y and the width x satisfy the relationship of $y \leq 0.143 + 6.486 \times 10^{-3}x + 7.904 \times 10^{-6}x^2$. Furthermore, experiments on the influence of the air suction pressure were conducted. It was found that, when a belt is once supported by air, the degree that the belt is raised by air does not depend on the air suction pressure, or that the air suction pressure does not exert influence in such a degree that the above-mentioned trough index is changed.

Figure 4A:
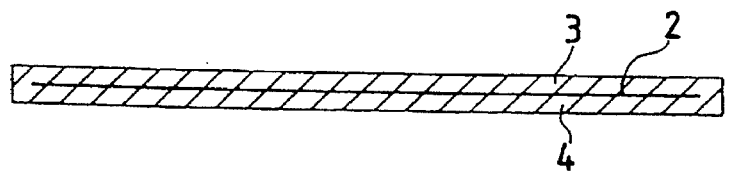
FIGS. 4(a), 4(b) and 4(c) show sectional views of conveyor belts made of rubber and having canvas embedded therein.
Figure 4B:
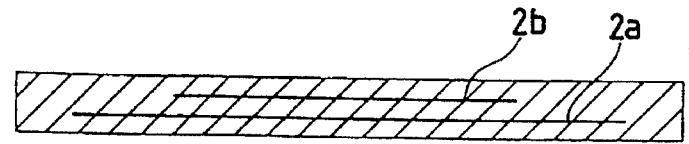
Figure 4C:
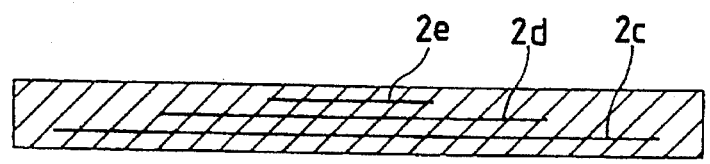

Next, the structure of a rubber belt which is designed so as to increase the trough index will be described with reference to FIGS. 4(a) to 6. FIG. 4(a) shows a belt which has one ply of canvas 2 and in which rubber cover plies 3 and 4 are stacked on both faces of the canvas ply. FIGS. 4(b) and 4(c) respectively show belts which have two or three canvas plies and in which the widths of the canvas plies are reduced in a step-like manner as indicated by 2a and 2b, or 2c, 2d and 2e, whereby the portions of rubber in both edges are increased so that the belts are easily deflected. Assuming that the numbers of canvas plies are the same, a belt having canvas plies which are formed in a step-like manner as shown in FIG. 4(c) has a larger trough index than that obtained in a belt in which the widths of canvas plies are equal to each other as shown in FIG. 4(a).

Figure 5A:
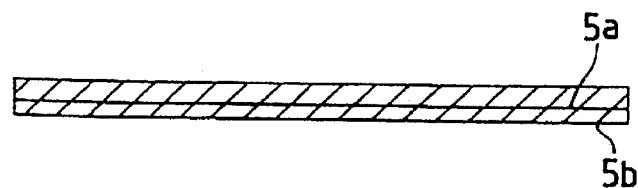
FIGS. 5(a), 5(b) and 5(c) show sectional views of conveyor belts made of rubber and having canvas embedded therein and also exposed on the surface.
Figure 5B:
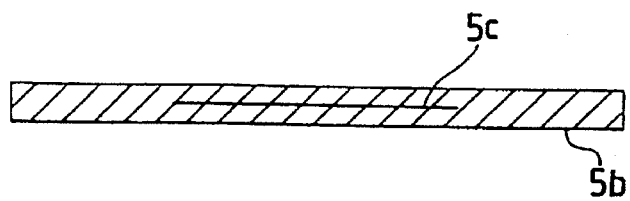
Figure 5C:
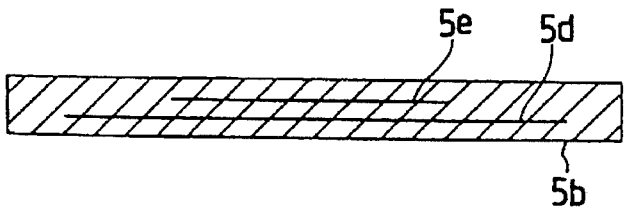

FIG. 5 shows belts in which canvas is exposed on the surface. When a conveyor apparatus uses a double pipe, the belt face contacting with the inner wall is inverted with respect to the inner and outer pipes. It is preferable that the canvas contacts with the surface of the inner pipe which has a smaller diameter. FIG. 5(a) shows a belt having a two-ply structure consisting of embedded canvas 5a and canvas 5b on the back face. When embedded canvas 5c has a reduced width as shown in FIG. 5(b), the trough index is greater. As shown in FIG. 5(c), furthermore, embedded canvas 5d and 5e may be gradually narrowed in a step-like manner. When the canvas is exposed on the surface, the portion of rubber cover shrinks in a vulcanization process and hence the belt is arcuately curved so as to easily extend along the inner wall of a pipe.

Figure 6:
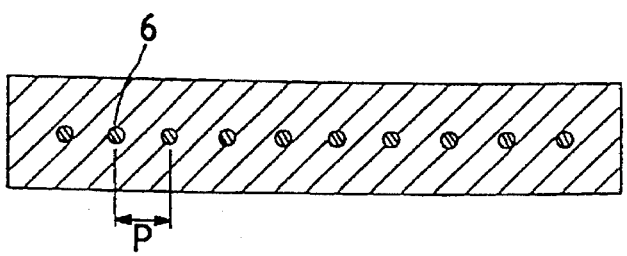
FIG. 6 shows a sectional view of a conveyor belt made of rubber and having a steel cord embedded therein.

As the material of the canvas shown in FIGS. 4(a)-5(c), nylon, vinylon, polyester, etc. may be used. A flexible conveyor belt made of such a material is suitable for a conveyor apparatus in which the transportation distance is relatively short. In a belt for a conveyor apparatus in which the transportation distance is relatively long, canvas is made of a material such as aramid fiber which has a small extension rate. In order to obtain a belt of a small extension rate, as shown in FIG. 6, steel cord 6 is used. In the case of using the steel cord 6, as the arrangement pitch p is made greater while the cord diameter is set to be small or 2 mm or less (usually, 2.5 mmφ is used), the trough index can be made larger. Canvas in which the weft in the width direction is composed of monofilaments is superior in flexibility than that in which the weft is composed of multifilaments.

Furthermore, experiments in which the diameter of the inner pipe or the belt width, and also the specification of belts were variously changed in the case of a flexible conveyor belt mainly made of a resin (one of polyurethane, polyvinyl chloride, and polyvinylon) will be described with reference to Table 2 below. The experiments were conducted by setting the trough index T so as to have various values in order to attain the complete support by air. In the same manner as Table 1, when the coefficient of friction was 0.08 or less, the belt was judged as excellent (⊚), when the coefficient of friction was greater than 0.08 but less than or equal to 0.1, the belt was judged as good (○), and, when the coefficient of friction was greater than 0.1, the belt was judged as poor (×). The belts are made of a resin. In the indications $PC_2$ and $C_3H$, the small numbers 2 and 3 indicate the number of canvas plies, P indicates that a moisture and heat resistant adhesive was used in the lamination of the canvas, and C and G indicate the kind of canvas such as polyester fabric canvas. The symbol H indicates the color or white.

In the flexible conveyor belt of the invention, the flexibility of the belt can be greatly increased by setting the trough index to be a considerably large value, so that air which flows along the lower inner wall of a circular pipe and causes the belt to be supported escapes surely along the circumferential directions, whereby the belt is allowed to run while being completely supported by the air. Therefore, the coefficient of friction is decreased and, hence, the power consumption of the conveyor apparatus can be reduced. Since the complete support by air is attained, moreover, any conveyor belt can be used as far as it has predetermined flexibility. Consequently, it is not required to select an expensive material which exhibits a lower coefficient of

TABLE 2

| No. | Diameter of inner pipe (φmm) | Belt Width (mm) | Belt specification | Total Thickness (mm) | Trough Index | Coefficient of friction | Judgment | Remarks |
| --- | --- | --- | --- | --- | --- | --- | --- | --- |
| 1 | 207.3 | 310 | $PG_2$ | 1.2 | 0.30 | 0.06 | ⊚ | Invention |
| 2 | 207.3 | 310 | $PC_2$ | 1.6 | 0.26 | 0.17~0.19 | X | Comparison |
| 3 | 207.3 | 310 | $C_2H$ | 1.7 | 0.19 | 0.25 | X | Comparison |
| 4 | 255.4 | 400 | $PC_2$ | 1.6 | 0.31 | 0.05 | ⊚ | Invention |
| 5 | 255.4 | 400 | $C_2H$ | 1.7 | 0.24 | 0.15 | X | Comparison |
| 6 | 343 | 500 | $PC_2$ | 1.6 | 0.34 | 0.05 | ⊚ | Invention |
| 7 | 343 | 500 | $C_2H$ | 1.7 | 0.28 | 0.15 | X | Comparison |
| 8 | 343 | 500 | $C_3H$ | 2.6 | 0.17 | 0.18 | X | Comparison |
| 9 | 439.2 | 650 | $C_2H$ | 1.7 | 0.32 | 0.02 | ⊚ | Invention |
| 10 | 582 | 800 | $C_2H$ | 1.7 | 0.35 | 0.02 | ⊚ | Invention |

Belt Nos. 1 to 3 in Table 2 have a small width or a width of 310 mm. Belt No. 1 which has a trough index of 0.30 was judged as excellent (⊚), and the belts which have a smaller trough index were judged as poor (×).

Belt Nos. 4 to 8 in Table 2 have a medium width or a width of 400 or 500 mm. In these belts, as the trough index is smaller, the coefficient of friction is greater irrespective of the ply number. Belt No. 4 which has a trough index of 0.31 was judged as excellent (⊚).

Belt Nos. 9 and 10 in Table 2 have a large width or a width of 650 or 800 mm. Both belt Nos. 9 and 10 which respectively have trough indexes of 0.32 and 0.35 were judged as excellent (⊚).

As a result of these experiments, in the case of a flexible conveyor belt which is made mainly of a resin, it will be noted that, when the trough index is 0.30 or greater, the belt has a coefficient of friction of 0.1 or less and can be judged as satisfactory. Unlike the belts made of rubber, the thickness dependence of the belts made of a resin was not observed. It is a matter of course that the canvas structures which are used for increasing the flexibility as described with reference to FIGS. 4(a) to 6 can be applied also to a flexible conveyor belt mainly made of a resin. Furthermore, a belt structure for increasing the trough index of a resin belt will be described. Assuming that canvas of the same material is used, the flexibility obtained when the weft of canvas in the width direction is composed of monofilaments is superior than that obtained when the weft is composed of multifilaments. As thinner yarn is used and the thickness is smaller, a higher trough index is obtained. Also, when the kind and blending proportion of the adhesive used in a yarn layer is changed, a higher trough index may be obtained.

The flexible conveyor belt of the invention is most suitable for the above-mentioned pipe conveyor. However, the invention is not restricted to a coaxial double pipe such as shown in FIG. 7, and may be applied also to an eccentric double pipe or a single pipe.

friction when rubbing as the main component of the belt, and also to raise the air suction pressure to a level higher than that needed. Furthermore, the high speed mass transportation is enabled. Since the belt width can be reduced and, hence, the apparatus can be designed so as to be compact, the conveyor belt contributes to the reduction in cost of an apparatus.

It is contemplated that numerous modifications may be made to the flexible conveyor belt of the present invention without departing from the spirit and scope of the invention as defined in the following claims.

What is claimed is:

1. A pipe conveyor comprising a circular pipe which defines a lower inner wall, a flexible conveyor belt which runs in a curved shape which elongates along said lower inner wall of said circular pipe while defining a space between said belt and said lower inner wall, and means for introducing pressurized air into the space, said belt having a thickness y (mm) and a width x (mm) and being mainly made of rubber, wherein said thickness y and said width x of said belt satisfy the following relationship:

$$y \leq 0.143 + 6.486 \times 10^{-3} x + 7.904 \times 10^{-6} x^2$$

and wherein said belt runs while being supported above said lower inner wall by the pressurized air which is introduced into the space between said belt and said lower inner wall.

2. The pipe conveyor according to claim 1, wherein a coefficient of friction between said belt and the lower inner wall of the circular pipe is equal to or less than 0.1.

3. The pipe conveyor according to claim 1, wherein the width x of said belt is substantially one-half of an internal circumference of the circular pipe.

4. The pipe conveyor according to claim 1, wherein said belt has one ply of canvas and rubber cover plies stacked on both faces of said canvas ply.

5. The pipe conveyor according to claim 1, wherein said belt has two plies of canvas and rubber cover plies stacked on both faces of said canvas plies.

6. The pipe conveyor according to claim 5, wherein the widths of said canvas plies are reduced in a step-like manner.

7. The pipe conveyor according to claim 1, wherein said belt has three plies of canvas and rubber cover plies stacked on both faces of said canvas plies.

8. The pipe conveyor according to claim 7, wherein the widths of said canvas plies are reduced in a step-like manner.

9. The pipe conveyor according to claim 4, wherein said canvas is selected from the group of nylon, vinylon, polyester, and aramid fiber.

10. The pipe conveyor according to claim 4, wherein said canvas in which the weft in the width direction is composed of multifilaments.

* * * * *